(12) United States Patent
Lewis et al.

(10) Patent No.: US 10,505,324 B2
(45) Date of Patent: Dec. 10, 2019

(54) BUSBAR TRUNKING SYSTEM

(71) Applicant: IBAR (EMEA) Ltd, Kendal Cumbria (GB)

(72) Inventors: Wayne Lewis, Kendal (GB); Paul Richard Lippiatt, Kendal (GB); Martin Peter Timbrell, Kendal (GB)

(73) Assignee: ANORD MARDIX DATABAR BUSWAY LIMITED, Kendal (GB)

( * ) Notice: Subject to any disclaimer, the term of this patent is extended or adjusted under 35 U.S.C. 154(b) by 0 days.

(21) Appl. No.: 15/683,362

(22) Filed: Aug. 22, 2017

(65) Prior Publication Data
US 2018/0062333 A1 Mar. 1, 2018

(30) Foreign Application Priority Data
Aug. 24, 2016 (EP) ..................................... 16185576

(51) Int. Cl.
| | |
|---|---|
| *H01R 25/16* | (2006.01) |
| *H01R 13/627* | (2006.01) |
| *H01R 13/642* | (2006.01) |
| *H01R 13/652* | (2006.01) |
| *H02G 5/06* | (2006.01) |
| *H01R 13/639* | (2006.01) |
| *H01R 25/14* | (2006.01) |

(Continued)

(52) U.S. Cl.
CPC ....... *H01R 25/162* (2013.01); *H01R 13/6273* (2013.01); *H01R 13/639* (2013.01); *H01R 13/642* (2013.01); *H01R 13/652* (2013.01); *H01R 25/145* (2013.01); *H02G 5/002* (2013.01); *H02G 5/005* (2013.01); *H02G 5/06* (2013.01); *H02B 1/16* (2013.01); *H02B 3/00* (2013.01)

(58) Field of Classification Search
CPC .................................................... H02G 5/007
USPC ................................ 439/212, 213, 218, 225
See application file for complete search history.

(56) References Cited

U.S. PATENT DOCUMENTS

| | | | | |
|---|---|---|---|---|
| 5,425,648 | A | * | 6/1995 | Farham .................. H01R 25/16 439/116 |
| 5,442,135 | A | * | 8/1995 | Faulkner ................ H02G 5/007 174/68.2 |
| 5,466,889 | A | * | 11/1995 | Faulkner ................ H02G 5/007 174/133 B |

(Continued)

FOREIGN PATENT DOCUMENTS

| | | |
|---|---|---|
| DE | 1203849 B | 10/1965 |
| EP | 335756 A1 | 10/1989 |

(Continued)

OTHER PUBLICATIONS

European Search Report for EP 16185576.2, search report dated Jan. 27, 2017.

(Continued)

*Primary Examiner* — Truc T Nguyen
*Assistant Examiner* — Milagros Jeancharles
(74) *Attorney, Agent, or Firm* — Howson & Howson LLP

(57) ABSTRACT

A section of a busbar trunking system, referred to herein as "a BTS section", comprising: a plurality of conducting bars; and a female electrical connector at a first end of the BTS section; wherein the female electrical connector is arranged to receive a male electrical connector of an adjacent BTS section to electrically connect the conducting bars of the BTS section to conducting bars of the adjacent BTS section as part of a plug-and-play connection.

16 Claims, 8 Drawing Sheets

(51) Int. Cl.
*H02G 5/00* (2006.01)
*H02B 1/16* (2006.01)
*H02B 3/00* (2006.01)

(56) References Cited

U.S. PATENT DOCUMENTS

| | | | | |
|---|---|---|---|---|
| 5,595,498 | A * | 1/1997 | Jego | H01R 13/6395 439/216 |
| 5,619,014 | A * | 4/1997 | Faulkner | H02G 5/007 174/129 B |
| 5,658,172 | A * | 8/1997 | Schmidt | H01R 9/26 439/709 |
| 5,676,557 | A * | 10/1997 | Jego | H01R 25/16 439/207 |
| 7,614,895 | B2 * | 11/2009 | Jur | H01R 25/162 439/108 |
| 8,262,401 | B1 | 9/2012 | Byrne | |
| 2012/0244755 | A1 * | 9/2012 | Suzuki | H01R 13/193 439/660 |
| 2014/0134855 | A1 * | 5/2014 | Kolbe | H01R 4/64 439/95 |
| 2015/0311654 | A1 | 10/2015 | McCauley et al. | |

FOREIGN PATENT DOCUMENTS

| | | |
|---|---|---|
| EP | 1786079 A1 | 5/2007 |
| EP | 1811622 A1 | 7/2007 |
| GB | 2344001 A | 6/2000 |
| JP | S60-162932 U | 10/1985 |
| WO | 98/44612 A1 | 10/1998 |

OTHER PUBLICATIONS

E&I Powerbar Engineering Group, "Intelligent Medium Powerbar", Brochure, pp. 1-7, 2015 (month unknown).
Universal Electric Corporation, "Starline Track Busway, Product Selection Guide", Brochure, pp. 1.1-15.13, Dec. 2014.
Smiths Interconnect/PDI, "Powerwave Bus System with Toughrail Technology", slide presentation, pp. 1-16, 2012 (month unknown).
Eaton, "Pow-R-Flex Low Ampere Busway—Flexible Power Distribution Solutions", Brochure, pp. 1-12, Mar. 2014.
Schneider Electric, "Powerbus Busway", Brochure, pp. 1-6, Feb. 2014.
Examination Report dated Aug. 26, 2019 issued in counterpart European Patent Application No. 16185576.2.

* cited by examiner

BUSBAR TRUNKING SYSTEM

FIELD OF THE INVENTION

The present invention relates to busbar trunking systems (BTSs), in particular but not exclusively, to busbar trunking system (BTS) sections, to power distribution systems that comprise a plurality of BTS sections, and to methods of joining BTS sections.

BACKGROUND

Traditional power distribution systems used in industrial facilities employ lengths of electrical cable housed in cable trays. Installation of cable trays and the associated cables is labour intensive, as is any reconfiguration of the power distribution system to take into account new loads that are to be connected to the system.

A BTS may be used to overcome many of the above-described problems. A BTS uses a number of BTS sections connected together, each BTS section comprising a series of electrical conductors enclosed within a protective housing. An external joint pack is used to make the connection between BTS sections, and tap off boxes are used to carry power from the conductors for supply to each load.

Installation and reconfiguration is simplified compared to cable/cable tray based systems, but the need for external joint packs, and the interaction between external joint packs and tap off boxes still lead to problems when there is limited space for installation/reconfiguration. This problem typically occurs in data centres where the BTS is installed above server racks, as the racks tend to increase in size over time in order to accommodate and as a consequence the amount of space around the BTS is reduced.

It is an aim of the present invention to address at least one problem associated with the prior art, whether referred to herein or otherwise.

SUMMARY OF THE INVENTION

According to a first aspect of the present invention, there is provided a busbar trunking system section, referred to herein as "a BTS section", comprising:
  a plurality of conducting bars; and
  a female electrical connector at a first end of the BTS section;
  wherein the female electrical connector is arranged to receive a male electrical connector of an adjacent BTS section to electrically connect the conducting bars of the BTS section to conducting bars of the adjacent BTS section.

In one example, the BTS section further comprises a male mechanical connector at the first end of the BTS section, wherein the male mechanical connector is arrangeable in use to be received by a female mechanical connector of an adjacent BTS section to mechanically connect the BTS section to the adjacent BIS section. In one example, the male mechanical connector comprises at least one spigot. In one example, the male mechanical connector comprises a plurality of spigots, corresponding to the plurality of conducting bars.

In one example, the BTS section further comprises a female mechanical connector at a second end thereof. In one example, the female mechanical connector is arranged in use to receive a male mechanical connector of an adjacent BTS section to mechanically connect the BTS section to the adjacent BTS section. In one example, the female mechanical connector comprises at least one socket. In one example the female mechanical connector comprises a plurality of sockets corresponding to the plurality of conducting bars.

In one example, the BTS section further comprises a male electrical connector at a second end thereof. In one example, the male electrical connector is arrangeable in use to be received by a female electrical connector of an adjacent BTS section to electrically connect the conducting bars of the BTS section to conducting bars of the adjacent BTS section.

In one example, the female electrical connector is arranged to receive a male electrical connector of a corresponding adjacent BTS section to electrically connect the conducting bars of the BTS section to conducting bars of the adjacent BTS section.

In one example, the female mechanical connector is arranged to receive a male mechanical connector of a corresponding adjacent BTS section, to mechanically connect the BTS section to the adjacent BTS section.

In one example, the female electrical connector comprises at least one coupler located within the BTS section, the coupler in electrical communication with a conducting bar of the BTS section and operable in use to receive a male electrical connector of an adjacent BTS section to electrically connect the conducting bar of the BTS section to a conducting bar of the adjacent BTS section. In one example, the coupler is a box-shaped coupler having side walls, a lower wall and an upper wall.

In one example, the coupler comprises at least one contact which is biased to form an electrical connection with a male electrical connector received in the coupler when in use. In one example the coupler comprises contacts provided on inner sides of side walls and inwardly biased to form an electrical connection with a male electrical connector received in the coupler when in use.

In one example the coupler comprises a dividing web, with at least one contact provided thereon and outwardly biased to form an electrical connection with a male electrical connector received in the coupler when in use. In one example, the coupler comprises a dividing web to be received between two conductors of a male electrical connector of an adjacent BTS section, when in use.

In one example, the coupler is located in a spigot of the male mechanical connector.

In one example, one of the first end and a second end of the BTS section comprises a first latch, operable in use to interlock with an adjacent BTS section, for example a corresponding BTS section. In one example, the other end of the BTS section to the end which comprises the first end comprises a detent, in use to interlock with a latch of an adjacent BTS section, for example a corresponding BTS section.

In one example, the BTS section further comprises a second latch operable in use to interlock with an adjacent BTS section, for example a corresponding BTS section. In one example the first latch and the second latch are located on opposite sides of the BTS section. In one example the first and second latch are symmetrical with one another.

In one example, the first latch, and/or the second latch comprises a first member rotatably mounted on the BTS section and a second member rotatably mounted on the first member, wherein the second member is operable in use to interlock with a detent on an adjacent BTS section, for example a corresponding BTS section.

In one example, the BTS section further comprises a pair of channels extending along opposite sides of the BTS section.

In one example, the BTS section further comprises a ribbed upper surface.

In one example, the BTS section further comprises an integrated fixing channel for installation hardware, for example for a grounding plate.

In one example, the BTS section further comprises a pre-defined tap off point for connection of a tap off box. In one example, the BTS section further comprises an ancillary cover to cover a pre-defined tap off point when no tap off box is mounted to the BTS section.

In one example, the BTS section further comprises a grounding plate to provide a grounding connection between the BTS section and an adjacent BTS section, in use. In one example, the BTS section further comprises a push fit connection for a grounding plate. In one example, the push fit connection for a grounding plate is provided in an integrated channel thereof.

In one example, each conducting bar comprises two conductors.

According to a second aspect of the invention there is provided a BTS section substantially as herein-described with reference to the accompanying figures.

According to a third aspect of the present invention there is provided a power distribution system comprising a plurality of conducting bars, the power distribution system comprising:

a first BTS section comprising a female electrical connector at a first end thereof, wherein the female electrical connector is arranged to receive a male electrical connector of an adjacent BTS section to electrically connect the conducting bars of the first BTS section to conducting bars of the adjacent BTS section; and a second BTS section comprising a male electrical connector arrangeable in use to be received by a female electrical connector of an adjacent BTS section to electrically connect the conducting bars of the second BTS section to conducting bars of the adjacent BTS section;

wherein the female electrical connector of the first BTS section and the male electrical connector of the second BTS section are connected to one another to provide an electrical connection between the conducting bars of the first and second sections of BTS.

In one example the first BTS section and/or second BTS section are as described in relation to the first or second aspects of the invention above.

According to a fourth aspect of the present invention there is provided a method of joining BTS sections, the method comprising According to the present invention there is provided an apparatus and method as set forth in the appended claims. Other features of the invention will be apparent from the dependent claims, and the description which follows.

BRIEF DESCRIPTION OF THE DRAWINGS

For a better understanding of the invention, and to show how embodiments of the same may be carried into effect, reference will now be made, by way of example, to the accompanying diagrammatic drawings in which.

DESCRIPTION OF EXAMPLE EMBODIMENTS

Figure 1A:
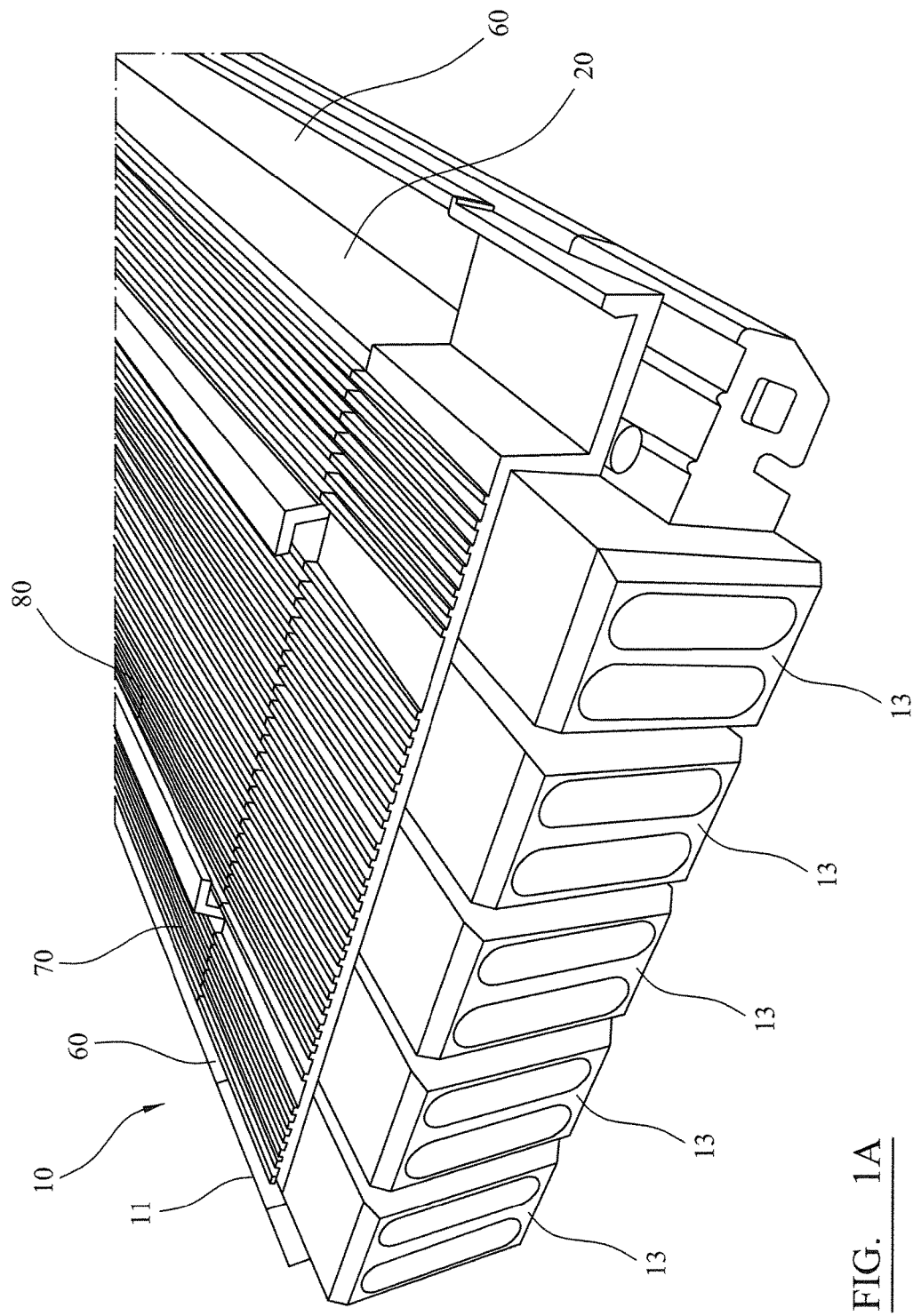
FIG. 1A is a perspective view of a BTS section showing the first end thereof.
Figure 1B:
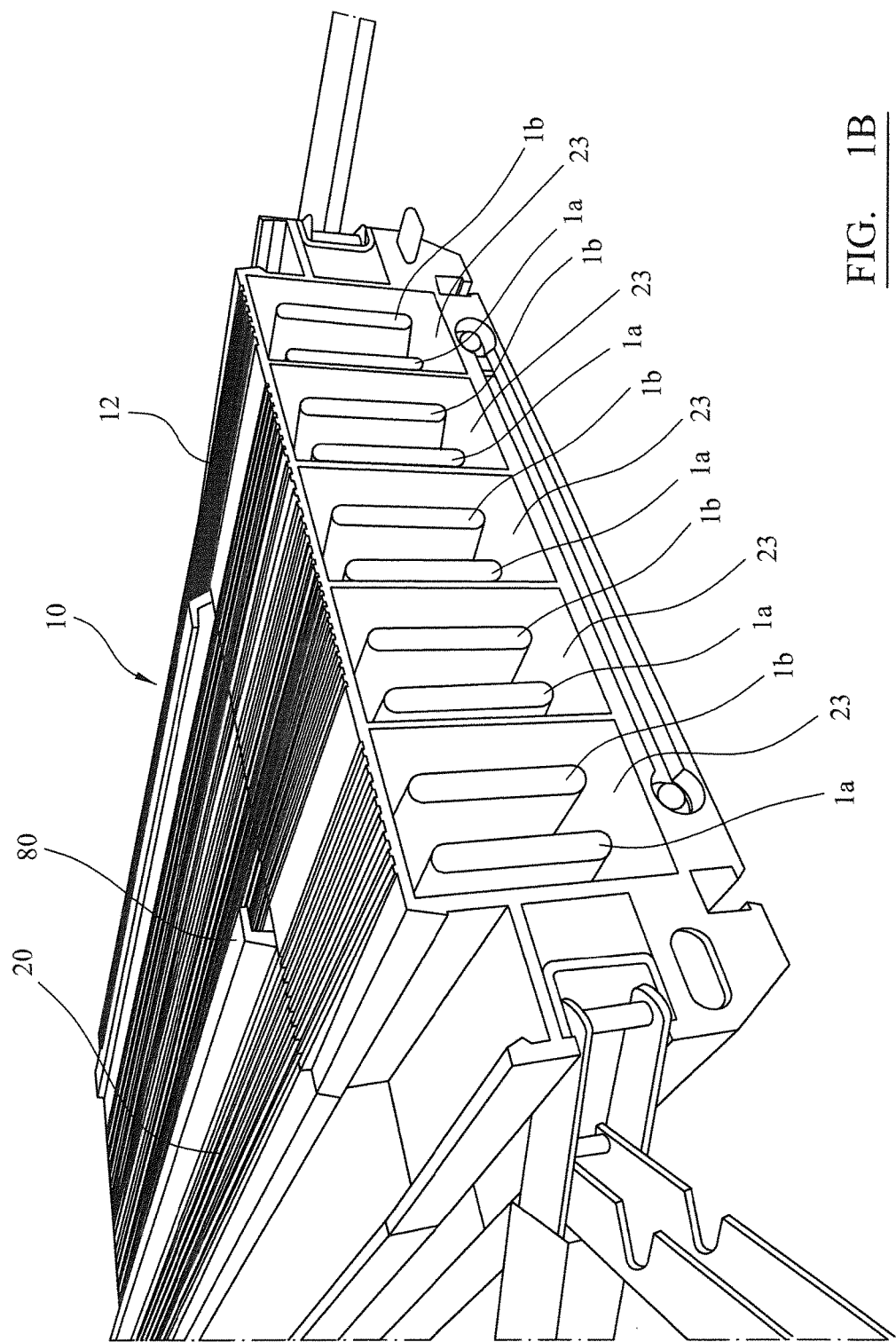
FIG. 1B is a perspective view of the BTS section of FIG. 1A showing the second end thereof.
Figure 2:
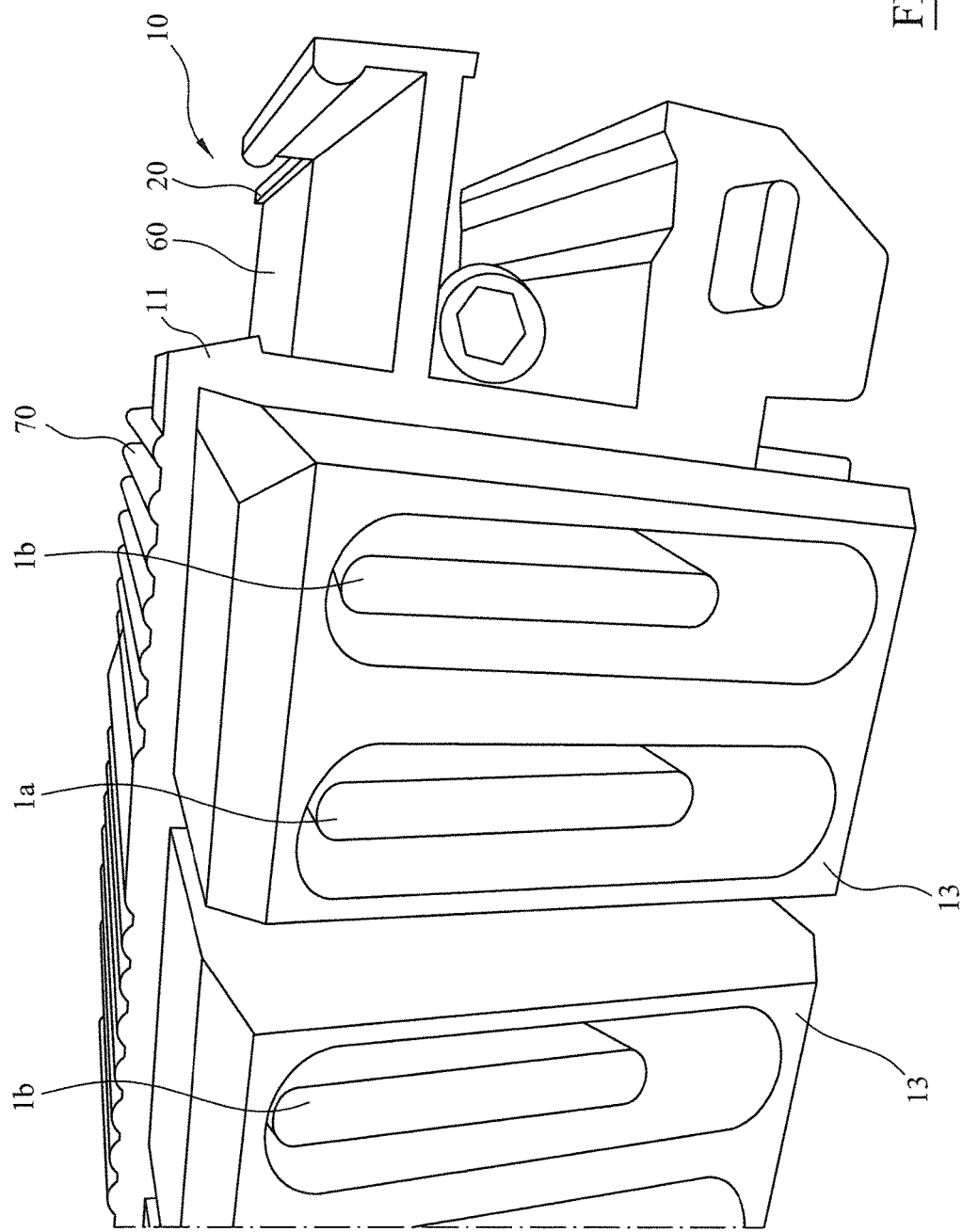
FIG. 2 is close up view of the first end of the BTS section of FIG. 1A.
Figure 4:
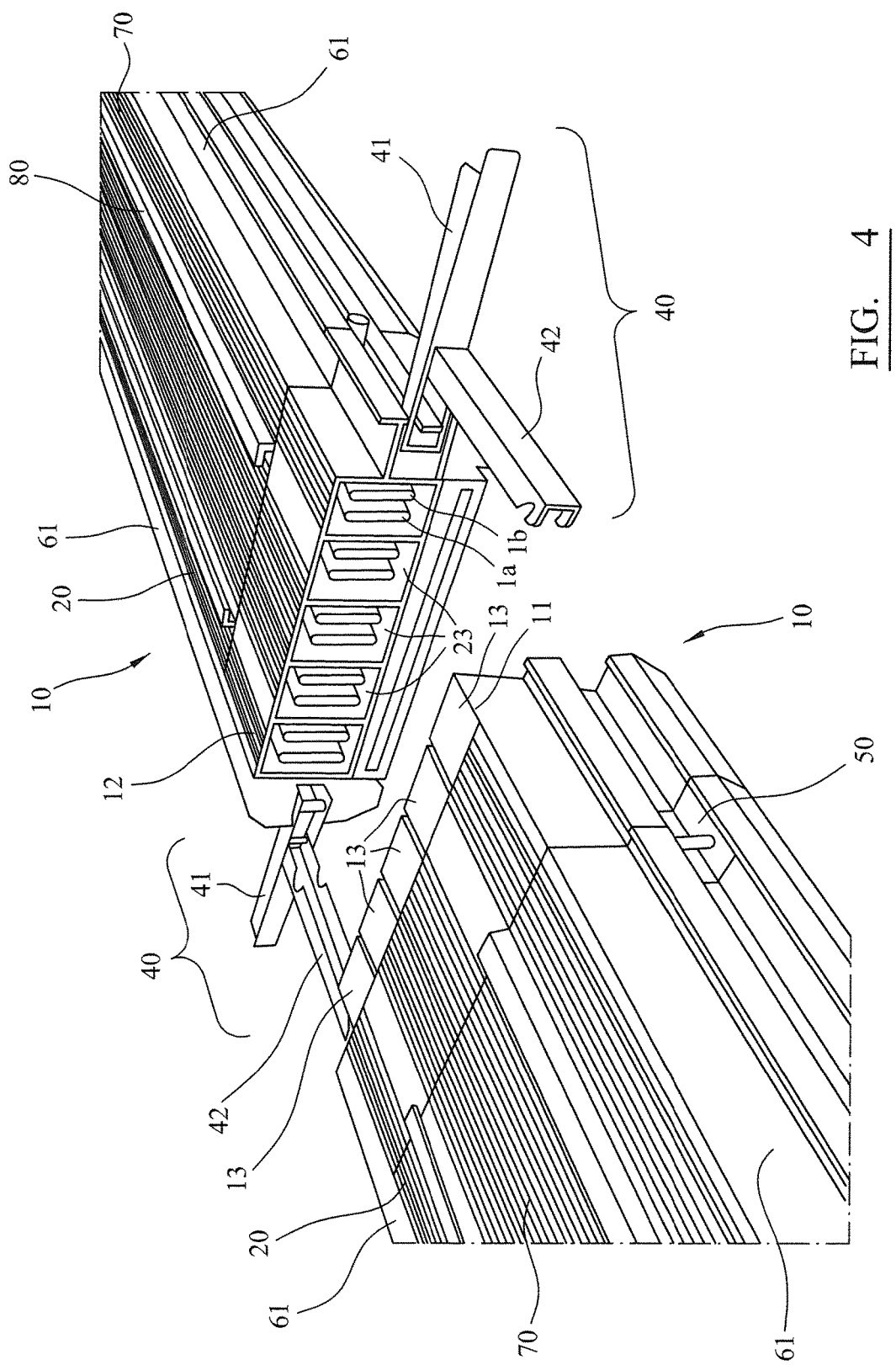
FIG. 4 is a perspective view of the BTS section of FIG. 1A arranged with a corresponding adjacent BTS section.
Figure 5:
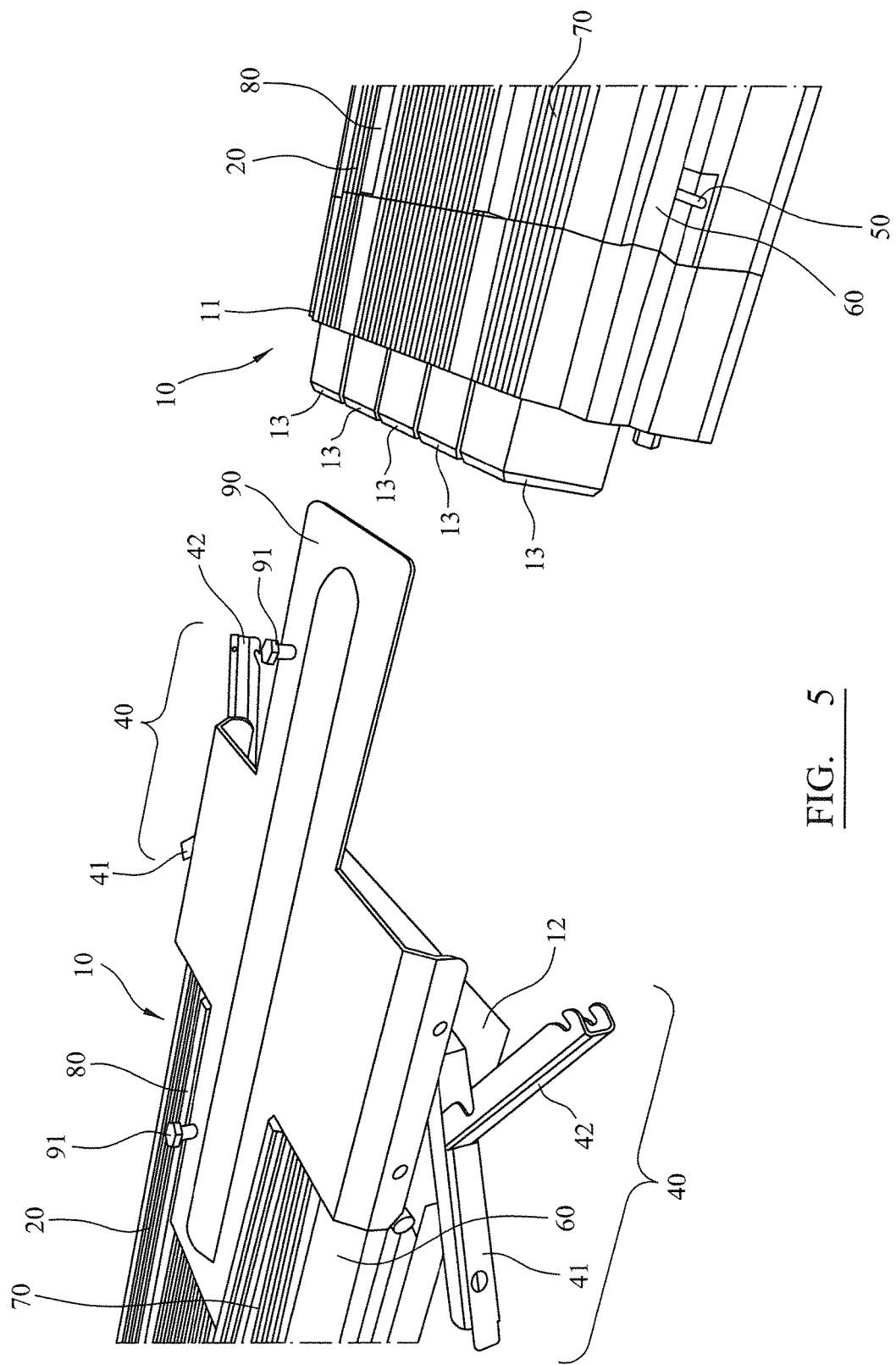
FIG. 5 is a perspective view of the BTS section of FIG. 1A arranged with a corresponding adjacent BTS section and a grounding plate prior to connection.
Figure 6:
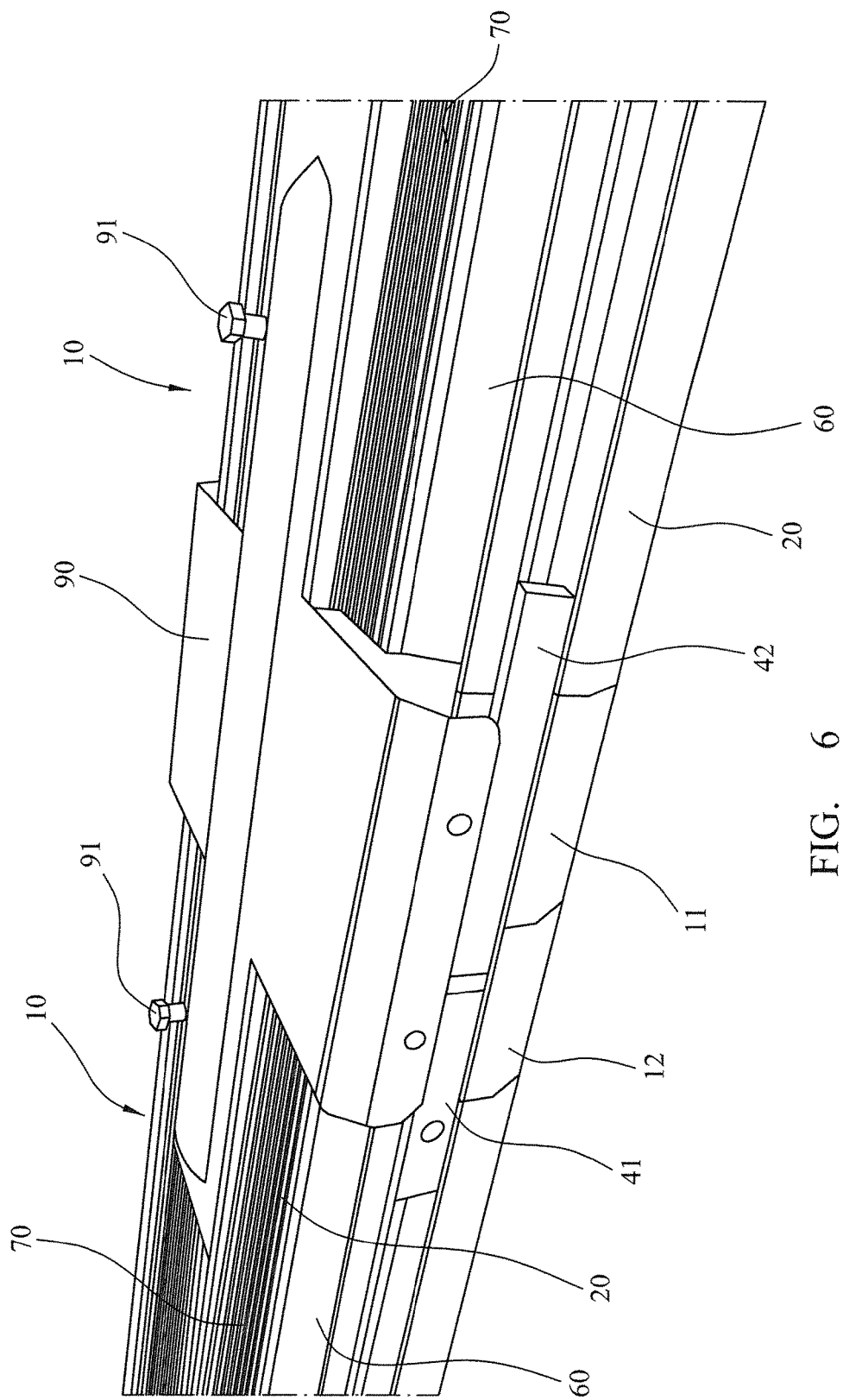
FIG. 6 is a perspective view of the BTS section of FIG. 1A arranged with a corresponding adjacent BTS section and a grounding plate once connected to one another.

Referring to FIGS. 1A, 1B and 2, there are shown perspective views of a BTS section 10, in particular the first end 11 and the second end 12 of the BTS section 10. The BTS section 10 comprises five conducting bars. The conducting bars as shown are each made up of two conductors 1a, 1b. The conducting bars run longitudinally in a housing 20 from the first end of the BTS section 10 to the second end 12 of the BTS section 10. The second end 12 of the BTS section 10 is also shown in FIGS. 4-6 and discussed in more detail below.

The first end 11 of the BTS section 10 comprises a female electrical connector which receives a male electrical connector of a adjacent BTS section 10 to electrically connect the conducting bars 1a, 1b of the BTS section 10 to conducting bars 1a, 1b of the adjacent BTS section 10 as part of a plug-and-play connection. The connection is made without the need for any additional configuration, so installation of the BTS section 10 as part of a power distribution system is simplified.

The BTS section 10 further comprises a male mechanical connector at the first end 11, to be received by a female mechanical connector of the adjacent BTS section 10 that serve in mechanically connecting the BTS section to the adjacent BTS section 10. The mechanical connectors work with the electrical connectors to make a safe union between the BTS sections 10, without the need for an external joint pack.

The male mechanical connector comprises five spigots 13, corresponding to the five conducting bars. The spigots 13 house couplers 30, which enable effective electrical connection between the conducting bars of adjacent BTS sections 10 when the BTS sections 10 are plugged one into one another.

Figure 3:
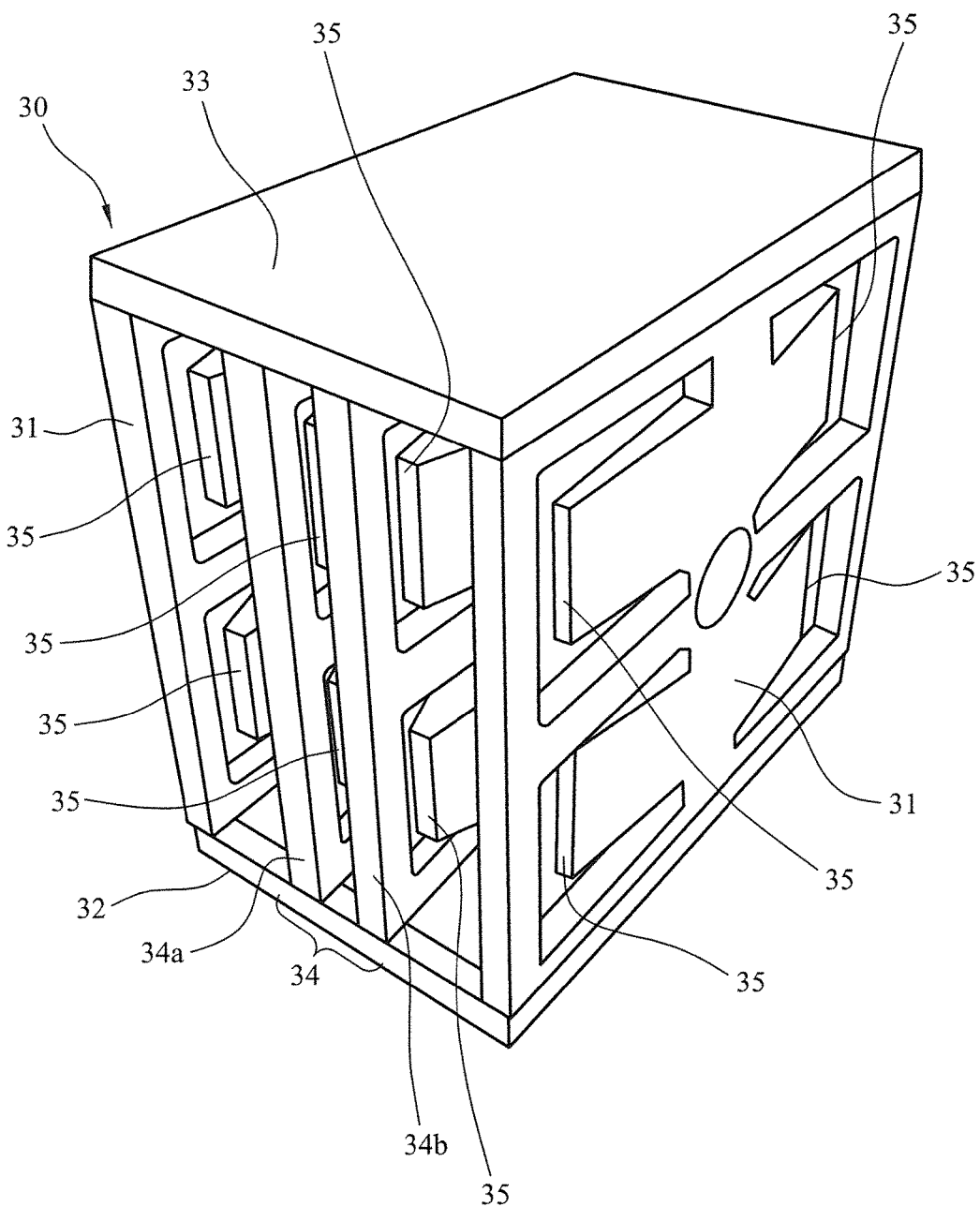
FIG. 3 is a perspective view of a coupler of the BTS section of FIG. 1A.

FIG. 3 shows a coupler 30 in isolation. The coupler 30 is a box-shaped unit having side walls 31, a lower wall 32 and an upper wall 33. Between the side walls 31 is a dividing web 34. The dividing web 34 lies toward the centre of the coupler 30, and is itself split into two web sections 34a, 34b. The side walls 31, 32 and web sections 34a, 34b comprise contacts 35 which are biased to form an electrical connection between the conductors 1a, 1b of the BTS section 10, on one side of the coupler, and to conductors 1a, 1b of the adjacent BTS section 10 on the other side of the coupler 30. In this way a symmetrical coupler design is possible, facilitating manufacture and installation of the coupler 30 in the BTS section 10.

The coupler 30, when housed in the spigots 13 of a BTS section 10, receives conductors 1a, 1b of the BTS section 10 that incorporates the coupler 30 in openings in the coupler 30 bounded by the side walls 31, upper and lower walls 32, 33 and the dividing web 34. There is a permanent electrical connection between the conductors 1a, 1b of the BTS section 10, established by the contacts 35 in the side of the coupler 30 that is away from the first end 11 of the BTS section 10. The openings in the coupler 30 bounded by the side walls 31, upper and lower walls 32, 33 and the dividing web 34 and facing outward from the first end 11 of the BTS section 10 in use to receive the conductors 1a, 1b of an adjacent BTS section 10.

The contacts 35 are able to deform elastically in order to accommodate the conductors 1a, 1b into the openings therein, and to provide suitable contact pressure. In addition, the split in the dividing web 34 into sections 34a, 34b enables space adjacent to the web sections 34a, 34b for the contacts 35 on the dividing web to be machined, and to in use deform to accommodate the conductors 1a, 1b. Similar considerations apply to the mounting of the coupler 30 in the spigot 13 so that there is a flexion space adjacent the side walls 31 in which contacts 35 is formed.

Although the example embodiment increases the number of contacts by providing contacts on opposed surfaces of the side walls 31 and dividing web 34, it will be appreciated that the provision of flexion space is advantageous in alternative embodiments in which one or more contacts is provided at only a single wall. However, the provision of contacts 35 on the opposed inward facing and outward facing surfaces within the coupler helps to improve the connection between the BTS section 10 and an adjacent BTS section 10 by enabling more contacts 35 to fit within the coupler 30.

As mentioned above, the first end 11 of the BTS section 10 comprises a female electrical connector and a male mechanical connector. The second end 12 of the BTS section 10 comprises the corresponding other halves of these connectors, i.e. the female mechanical connector and the male electrical connector. By providing the BTS section 10 with respective first and second ends 11, 12 a power distribution system can be easily set up with BTS section 10 connected with first end connected to second end, and so on between each adjacent BTS section. This simplifies manufacture and installation of the power system as there is consistence in the nature and orientation of the connections.

The female mechanical connector at the second end 12 of the BTS section 10 comprises at least one socket that is arranged in use to receive a male mechanical connector of a corresponding adjacent BTS section 10, to mechanically connect the BTS section 10 to the adjacent BTS section 10. In the embodiment of FIGS. 1B and 4 the female mechanical connector comprises a plurality of sockets 23 with a socket 23 for each spigot 13, and correspondingly therefore a socket 23 for each of the conducting bars.

Within each socket 23, FIGS. 1B and 4 show a male electrical connector, formed as the end of the conductors 1a, 1b protruding from the housing 20 yet within the sockets 23. The conductors 1a, 1b are received by a female electrical connector of an adjacent BTS section 10, i.e. by the coupler 30, to electrically connect the conductors 1a, 1b of the BTS section 10 to the conductors 1a, 1b of the adjacent BTS section 10 via the contacts 35 in the coupler 30.

Once the connection between the BTS section 10 and adjacent BTS section 10 has been made, a latch provided on one or other of the BTS sections 10 is used to interlock the BTS sections 10. In the example embodiments shown in the Figures, the second end 12 of the BTS section 10 comprises a latch mechanism and the first end 11 of the adjacent BTS section 10 comprises a detent 50. The latch 40 is carried on the BTS section 10, integrated therewith at the first end thereof, and the adjacent BTS section 10 likewise comprised the detent 50 integrated therewith at the second end thereof. As will be appreciated from FIGS. 4-6, the latch 40/detent 50 may be provided as a first latch and second latch with respective detents on opposite sides of the BTS sections 10.

Operation of the latch 40 is now described with reference to FIGS. 4-6. The latch 40 comprises a first member 41 rotatably mounted on the BTS section, proximate to the second end 12. The latch 40 further comprises a second member 42 rotatably mounted on the first member 41. Rotation of the first member 41 away from the housing 20 moves the second member 42 away from the second end, enabling a hook on the second member 42 to interlock with a detent 50 on an adjacent BTS section 10 that is connected to the BTS section 10. Movement of the first member 41 back to a position alongside the housing 20 draws the BTS sections 10 together by pulling the hook on second member 42 against the detent 50. Release of the interlock provided by the latch 40 and detent 50 involves reversing the operation procedure as above.

In one example, the housing 20 of the BTS section further 10 comprises a pair of channels 60, extending along opposite sides of the BTS section 10. These are provided as a convenient location to run network cables for communication along the power distribution system, for example for metering purposes. FIGS. 5 and 6 show the channels as open, and FIG. 4 shows the channels 60 provided with covers 61.

The BTS section 10 further comprises a ribbed upper surface 70 for improved thermal properties, and similarly a ribbed lower surface (not shown).

Figure 7:
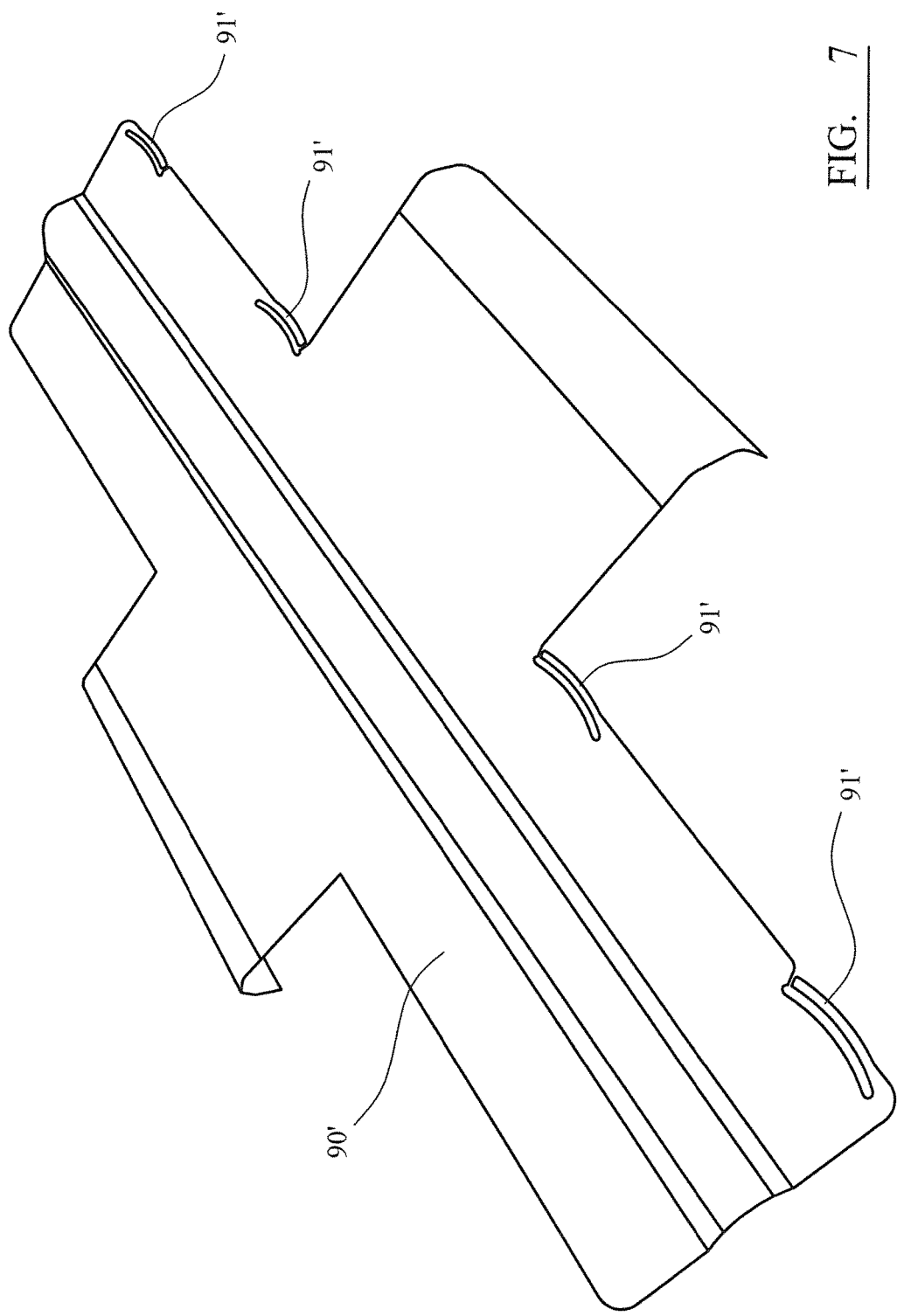
FIG. 7 is a perspective view of an alternative grounding plate for use with the BTS section of FIG. 1A.

In order to provide a continuous grounding path between one BTS section 10 and the next, an integrated fixing channel 80 for a grounding plate 90 is also provided. FIGS. 5 and 6 show a grounding plate 90 that has been slid into the fixing channel 80 on one BTS section 10, that is then received in the fixing channel 80 on the adjacent BTS section 10 after the BTS sections 10 are connected. A locator in the form of a bolt 91 is provided to hold the grounding plate 90 in place. Optionally a second bolt 91 is also provided, and FIG. 7 shows an alternative grounding plate 90' with locators 91' in the form of sprung protrusions to frictionally engage the inside of the fixing channel 80 such as by forming a push fit at corresponding specific features provided therein (not shown), or a push fit at the generally flat inner surfaces as shown in the earlier Figures.

It will be understood that when the BTS section 10 is provided in a power distribution system, the housing 20 is provided on the lower surface thereof, one or more pre-defined tap off points (not shown) for connection of a tap off box, or may be otherwise open. In one example embodiment, the BTS section 10 is further provided with an ancillary cover (not shown) to cover either a pre-defined tap off point when no tap off box is mounted to the BTS section, or open features of the lower surface more generally.

Although a few preferred embodiments have been shown and described, it will be appreciated by those skilled in the art that various changes and modifications might be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

We claim:

1. A section of a busbar trunking system (BTS), comprising:
   a plurality of conducting bars;
   a female electrical connector at a first end of the BTS section; and
   a male mechanical connector at the first end of the BTS section,
   wherein the female electrical connector is arranged to receive a male electrical connector of an adjacent BTS section to electrically connect the conducting bars of the BTS section to conducting bars of the adjacent BTS section as part of a plug-and-play connection,
   wherein the male mechanical connector is arrangeable in use to be received by a female mechanical connector of an adjacent BTS section to mechanically connect the BTS section to the adjacent BTS section without the need for an external joint pack,
   wherein the male mechanical connector comprises a plurality of spigots, corresponding to the plurality of conducting bars,
   wherein the female electrical connector comprises at least one coupler located within the BTS section, the coupler in electrical communication with a conducting bar of the BTS section and operable in use to receive a male electrical connector of an adjacent BTS section to electrically connect the conducting bar of the BTS section to a conducting bar of the adjacent BTS section,
   wherein the coupler comprises at least one contact which is biased to form an electrical connection with a male electrical connector received in the coupler when in use, and
   wherein the coupler comprises a dividing web, with at least one contact provided thereon and outwardly biased to form an electrical connection with a male electrical connector received in the coupler when in use.

2. The BTS section of claim 1, further comprising:
   a female mechanical connector at a second end thereof,
   wherein the female mechanical connector is arranged in use to receive a male mechanical connector of an adjacent BTS section to mechanically connect the BTS section to the adjacent BTS section.

3. The BTS of claim 2, wherein the female mechanical connector comprises a plurality of sockets corresponding to the plurality of conducting bars.

4. The BTS section of claim 1, further comprising
   a male electrical connector at a second end thereof;
   wherein the male electrical connector is arrangeable in use to be received by a female electrical connector of an adjacent BTS section to electrically connect the conducting bars of the BTS section to conducting bars of the adjacent BTS section.

5. The BTS section of claim 1, wherein the coupler comprises contacts provided on inner sides of side walls of the coupler and the contacts are inwardly biased.

6. The BTS section of claim 1, wherein the coupler is located in a spigot of the male mechanical connector.

7. The BTS section of claim 1, wherein one of the first end and a second end comprises a first latch, operable in use to interlock with an adjacent BTS section.

8. The BTS section of claim 7, wherein the other end of the BTS section to the end which comprises the first end comprises a detent, in use to interlock with a latch of an adjacent BTS section.

9. The BTS section of claim 7, wherein the first latch comprises a first member rotatably mounted on the BTS section and a second member rotatably mounted on the first member, wherein the second member is operable in use to interlock with a detent on an adjacent BTS section.

10. The BTS section of claim 7, wherein the BTS section further comprises a second latch, operable in use to interlock with an adjacent BTS section.

11. The BTS section of claim 10, wherein the first latch and the second latch are located on opposite sides of the BTS section.

12. The BTS section of claim 11, wherein the first latch and the second latch are symmetrical with one another.

13. The BTS section of claim 1, further comprising a grounding plate to provide a grounding connection between the BTS section and an adjacent BTS section, in use.

14. The BTS section of claim 13, further comprising a push fit connection for the grounding plate.

15. A power distribution system comprising a plurality of conducting bars, the power distribution system comprising:
    a first busbar trunking system (BTS) section comprising a female electrical connector at a first end thereof and a male mechanical connector at the first end thereof, wherein the female electrical connector is arranged to receive a male electrical connector of an adjacent BTS section to electrically connect the conducting bars of the first BTS section to conducting bars of the adjacent BTS section, wherein the male mechanical connector is arrangeable in use to be received by a female mechanical connector of an adjacent BTS section to mechanically connect the BTS section to the adjacent BTS section without the need for an external joint pack, wherein the male mechanical connector comprises a plurality of spigots, corresponding to the plurality of conducting bars, wherein the female electrical connector comprises at least one coupler located within the BTS section, the coupler in electrical communication with a conducting bar of the BTS section and operable in use to receive a male electrical connector of an adjacent BTS section to electrically connect the conducting bar of the BTS section to a conducting bar of the adjacent BTS section, wherein the coupler comprises at least one contact which is biased to form an electrical connection with a male electrical connector received in the coupler when in use, and wherein the coupler comprises a dividing web, with at least one contact provided thereon and outwardly biased to form an electrical connection with a male electrical connector received in the coupler when in use; and
    a second BTS section comprising a male electrical connector arrangeable in use to be received by a female electrical connector of an adjacent BTS section to electrically connect the conducting bars of the second BTS section to conducting bars of the adjacent BTS section;

wherein the female electrical connector of the first BTS section and the male electrical connector of the second BTS section are connected to one another to provide an electrical connection between the conducting bars of the first and second sections of BTS.

16. A section of a busbar trunking system (BTS), comprising:
a plurality of conducting bars;
a female electrical connector and a male mechanical connector at a first end of the BTS section, wherein the male mechanical connector comprises a plurality of spigots, corresponding to the plurality of conducting bars; and
a female mechanical connector at a second end thereof,
wherein the female electrical connector is arranged to receive a male electrical connector of an adjacent BTS section to electrically connect the conducting bars of the BTS section to conducting bars of the adjacent BTS section as part of a plug-and-play connection,
wherein the female electrical connector comprises at least one coupler located within the BTS section, the coupler in electrical communication with a conducting bar of the BTS section and operable in use to receive a male electrical connector of an adjacent BTS section to electrically connect the conducting bar of the BTS section to a conducting bar of the adjacent BTS section,
wherein the coupler comprises at least one contact which is biased to form an electrical connection with a male electrical connector received in the coupler when in use,
wherein the coupler comprises a dividing web, with at least one contact provided thereon and outwardly biased to form an electrical connection with a male electrical connector received in the coupler when in use, and
wherein the female mechanical connector is arranged in use to receive a male mechanical connector of an adjacent BTS section to mechanically connect the BTS section to the adjacent BTS section.

* * * * *